(12) United States Patent
Shimoyama

(10) Patent No.: US 8,974,941 B2
(45) Date of Patent: Mar. 10, 2015

(54) STORAGE DEVICE FOR BATTERY MODULES

(75) Inventor: Yoshiro Shimoyama, Inzai (JP)

(73) Assignees: Hyundai Motor Company, Seoul (KR); Hyundai Motor Japan R&D Center Inc., Chiba (JP); Kia Motors Corporation, Seoul (KR)

( * ) Notice: Subject to any disclaimer, the term of this patent is extended or adjusted under 35 U.S.C. 154(b) by 1609 days.

(21) Appl. No.: 11/869,495

(22) Filed: Oct. 9, 2007

(65) Prior Publication Data

US 2008/0206634 A1    Aug. 28, 2008

(30) Foreign Application Priority Data

Feb. 26, 2007   (KR) .................. 10-2007-0019146

(51) Int. Cl.
| | | |
|---|---|---|
| *H01M 10/50* | (2006.01) | |
| *H01M 2/10* | (2006.01) | |
| *H01M 10/613* | (2014.01) | |
| *H01M 10/617* | (2014.01) | |
| *H01M 10/6563* | (2014.01) | |
| *H01M 10/6566* | (2014.01) | |
| *H01M 10/643* | (2014.01) | |

(52) U.S. Cl.
CPC ........ *H01M 2/1077* (2013.01); *H01M 10/5004* (2013.01); *H01M 10/5008* (2013.01); *H01M 10/5067* (2013.01); *H01M 10/5073* (2013.01); *H01M 10/503* (2013.01)
USPC ............... 429/120; 429/96; 429/99; 429/100; 429/159

(58) Field of Classification Search
USPC ........ 320/107, 112; 429/96, 97, 99, 100, 120, 429/107, 112, 159
See application file for complete search history.

(56) References Cited

U.S. PATENT DOCUMENTS

| | | | | |
|---|---|---|---|---|
| 6,111,387 | A | * | 8/2000 | Kouzu et al. .................. 320/107 |
| 2001/0017531 | A1 | * | 8/2001 | Sakakibara et al. .......... 320/106 |
| 2008/0121380 | A1 | * | 5/2008 | Shimoyama .................. 165/121 |

FOREIGN PATENT DOCUMENTS

| | | |
|---|---|---|
| CN | 1295950 A | 5/2001 |
| JP | 2000-223099 | 8/2000 |
| JP | 2000-223099 A | 8/2000 |
| JP | 2000-301954 A | 10/2000 |
| JP | 2001-185103 | 7/2001 |
| JP | 2001-185103 A | 7/2001 |
| JP | 2001-291533 A | 10/2001 |
| JP | 2001-325996 A | 11/2001 |

(Continued)

*Primary Examiner* — Gregg Cantelmo
(74) *Attorney, Agent, or Firm* — Morgan, Lewis & Bockius LLP

(57) ABSTRACT

A storage device for battery modules includes a housing made up of outer walls, inner walls between the outer walls, and bridge walls connecting the outer walls with the inner walls. The inner and outer walls define through holes, each configured to receive a battery module therein. The housing defines several fluidly isolated air flow spaces. The device also includes fins, each protruding from one of the bridge walls and blocking a portion of one of the flow spaces. An alternative storage device for battery modules includes a housing made up of outer walls and inner walls between the outer walls. The inner and outer walls define through holes, each configured to receive a battery module therein. The housing defines several fluidly isolated air flow spaces. The device also includes fins, each blocking a portion of one of the flow spaces and connecting the outer walls with the inner walls.

11 Claims, 5 Drawing Sheets

(56) References Cited

FOREIGN PATENT DOCUMENTS

| JP | 2002-033136 | 1/2002 |
|---|---|---|
| JP | 2002-33136 A | 1/2002 |
| JP | 2004-031248 | 1/2004 |
| JP | 2004-31248 A | 1/2004 |
| JP | 2004-047361 | 2/2004 |
| JP | 2004-47361 A | 2/2004 |
| JP | 2005-5167 A | 1/2005 |
| JP | 2005-294023 A | 10/2005 |
| JP | 2007-73205 A | 3/2007 |

* cited by examiner

STORAGE DEVICE FOR BATTERY MODULES

CROSS-REFERENCE TO RELATED APPLICATIONS

The present application is based on, and claims priority from, Korean Application Serial Number 10-2007-0019146, filed on Feb. 26, 2007, the disclosure of which is hereby incorporated by reference herein in its entirety.

FIELD OF THE INVENTION

The present invention relates to a storage device for battery modules.

BACKGROUND OF THE INVENTION

In general, battery modules for hybrid vehicles are arranged in rows inside a storage device, in electrical and mechanical communication with each other. A typical storage device has several rows, each with an air inlet at one end and an air outlet at the other end. The rows are separated from one another by walls defining through holes therein. Fins are provided in the spaces defined between the walls, and cool the battery modules with the air flowing through the air inlets. Each fin includes a plate member, blocking plates adjacent to the thorough-holes, and a flange that fastens the fin to the housing.

The structure of the typical device is complicated. Further, some areas are over cooled due to air flowing in gaps between the blocking plates and the walls. Further, the portions of the battery modules in contact with the through-holes are never cooled, because air does not contact with them.

SUMMARY OF THE INVENTION

A storage device for battery modules includes a housing made up of outer walls, inner walls between the outer walls, and bridge walls connecting the outer walls with the inner walls. The inner and outer walls define through holes, each configured to receive a battery module therein. The housing defines several fluidly isolated air flow spaces. The device also includes fins, each protruding from one of the bridge walls and blocking a portion of one of the flow spaces.

The fins may be integral with the bridge walls. The bridge walls themselves may be the fins. Alternatively, the fins may be detachably fitted in the outer walls, the inner walls, and the bridge walls. The outer walls, the inner walls, and the bridge wall may have grooves configured for the fins to be fitted therein.

Each fin may be made up of a first plate attached to one of the bridge walls, and at least one second plate protruding from the first plate.

The heights from the bridge wall of the fins may decrease along the air-flow direction of the housing.

An alternative storage device for battery modules includes a housing made up of outer walls and inner walls between the outer walls. The inner and outer walls define through holes, each configured to receive a battery module therein. The housing defines several fluidly isolated air flow spaces. The device also includes fins, each blocking a portion of one of the flow spaces and connecting the outer walls with the inner walls.

Each fin may have a polygonal cross-section. A thickness of the cross-section of the fins may decrease along the air flow direction of the housing.

BRIEF DESCRIPTION OF THE DRAWINGS

For a better understanding of the nature and objects of the present invention, reference should be made to the following detailed description with the accompanying drawings, in which.

DETAILED DESCRIPTION OF THE PREFERRED EMBODIMENTS

Figure 1A:
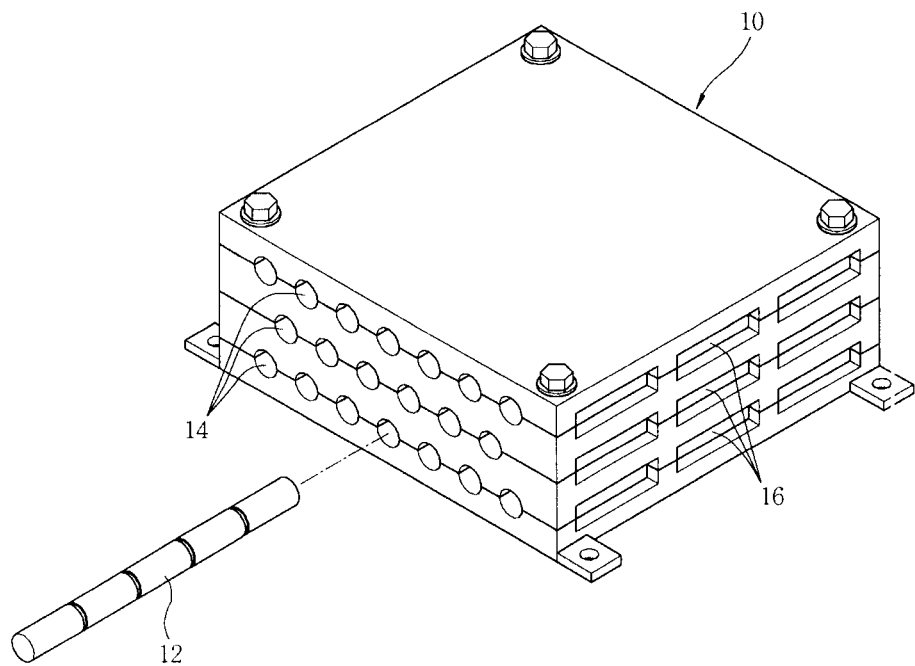
FIG. 1A is a perspective view showing a storage device for battery modules according to an embodiment of the invention.
Figure 1B:
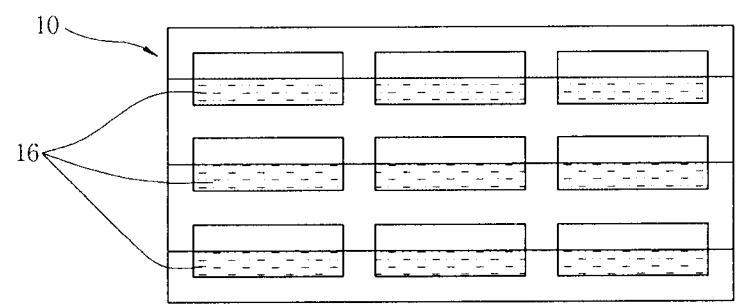
FIG. 1B is a front view showing a storage device for battery modules according to an embodiment of the invention.

A storage device for battery modules includes a housing 10 with an air inlet and an air outlet at opposite ends. Through-holes 14 are provided across the air-flow direction, and receive battery modules 12 Therein. Fins 16 cool the battery modules 12 by blocking a portion of each longitudinal cross-sectional area in the air-flow direction in housing 10.

Housing 10 includes two outer walls 10a, several inner walls 10b, and bridge walls 10c connecting the outer walls 10 to the inner walls 10b, or the inner walls 10b to other inner walls 10b.

Figure 2:
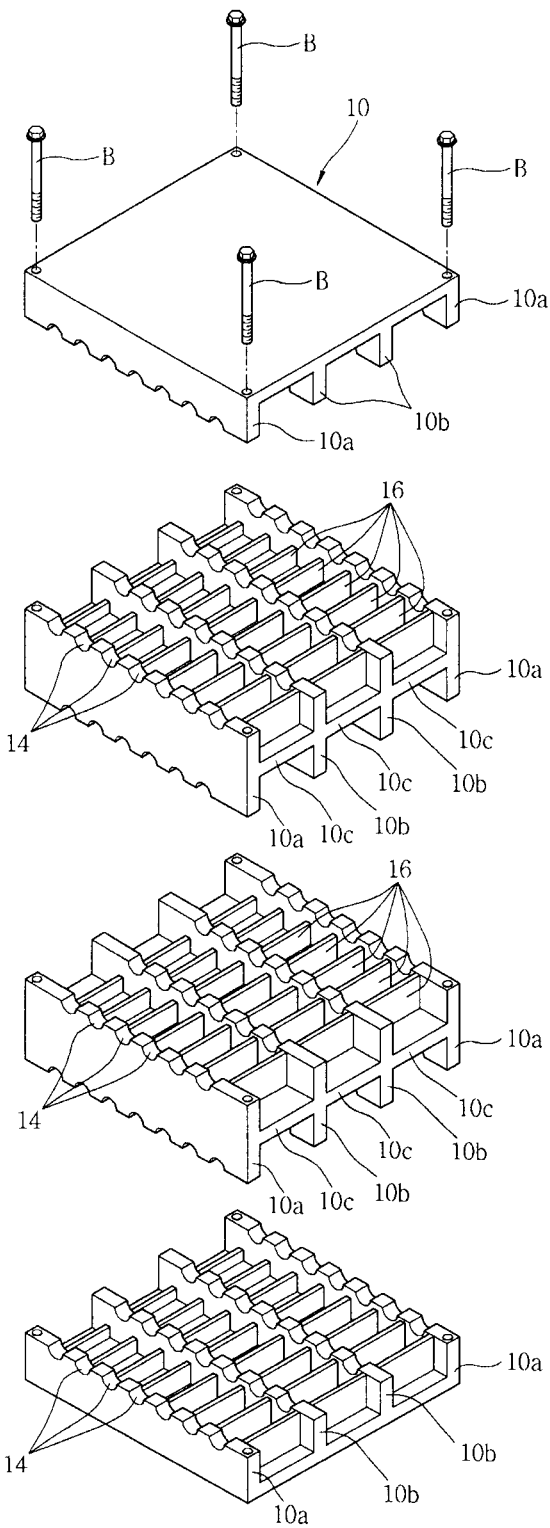
FIG. 2 is an exploded perspective view of FIG. 1A.

Semicircular through-holes 14 are provided on the upper and/or lower ends of outer walls 10a and inner walls 10b. The through-holes 14 form complete circles when the housing is assembled, and provide receiving spaces for battery modules 12. Housing 10 is thus sectioned into a plurality of air flow spaces by the separate components of the housing such as those shown in FIG. 2.

Threaded holes 10d are provided at the corners of the housing components to fasten them with bolts after being assembled.

Figure 3:
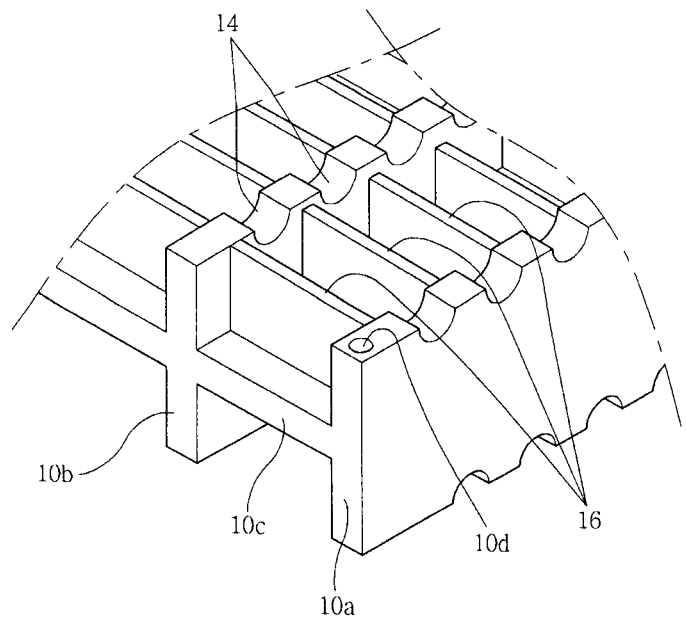
FIG. 3 is a view illustrating the configuration of fins according to a first embodiment of the invention.

As shown in FIG. 3, fins 16 protrude from outer walls 10a or inner walls 10b to corresponding opposite walls. If the inlet of the housing 10 is considered the front, the fins are disposed in front of through-holes 14. Fins 16 each blocks a portion of the longitudinal cross-sectional area of the flow spaces in housing 10. Fins 16 may completely connect outer walls 10a with inner walls 10b, or inner walls 10b with other inner walls 10b. In the embodiment illustrated in FIG. 3, the fins 16 are integral to the bridge walls 10c.

Figure 4:
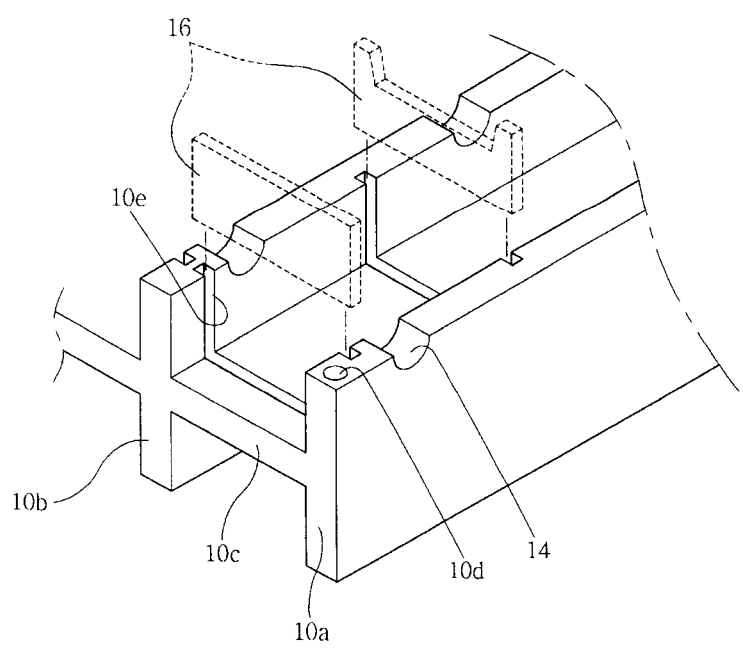
FIG. 4 is a view illustrating the configuration of fins according to a second embodiment of the invention.

According to a second embodiment of the invention, as shown in FIG. 4, fins 16 are detachably fitted in outer walls 10a, inner walls 10b, and bridge walls 10c. Fitting grooves 10e where fins 16 are inserted are provided on outer walls 10a, inner walls 10b, and bridge walls 10c.

Figure 5:
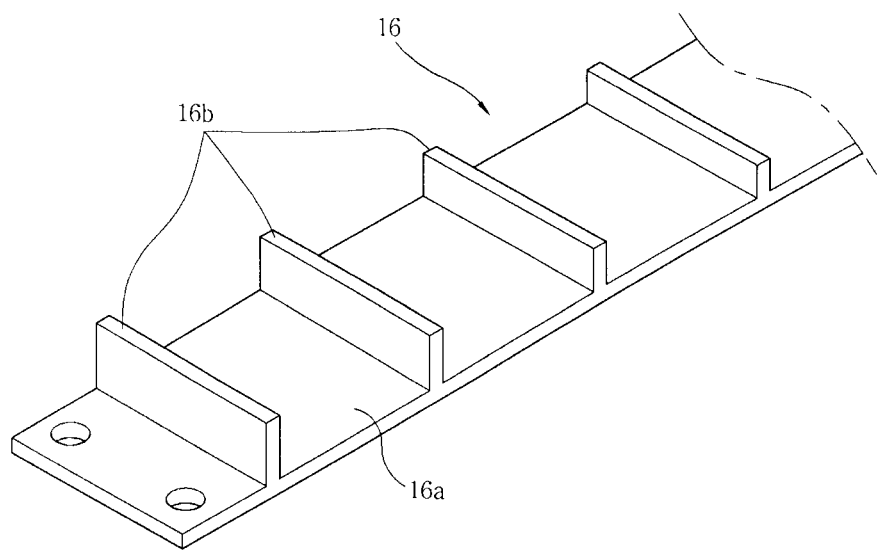
FIG. 5 is a view illustrating the configuration of fins according to a third embodiment of the invention.

According to a third embodiment of the invention, as shown in FIG. 5, fins 16 are each composed of a horizontal plate 16a that is placed on and fixed to bridge wall 10c and at least one vertical plate 16b protruding from horizontal plate 16a. The heights of fins 16 from bridge walls 10c gradually decrease in the air-flow direction in order to ensure uniform cooling performance for battery modules 12.

Figure 6:
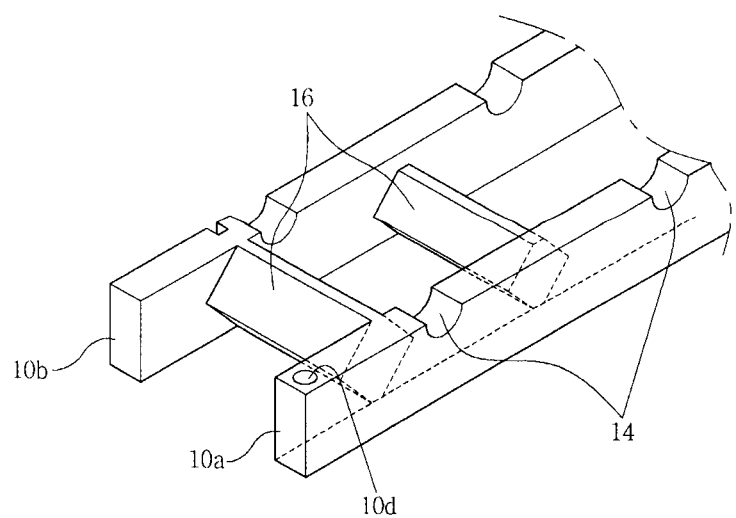
FIG. 6 is a view illustrating the configuration of fins according to a fourth embodiment of the invention.
Figure 7:
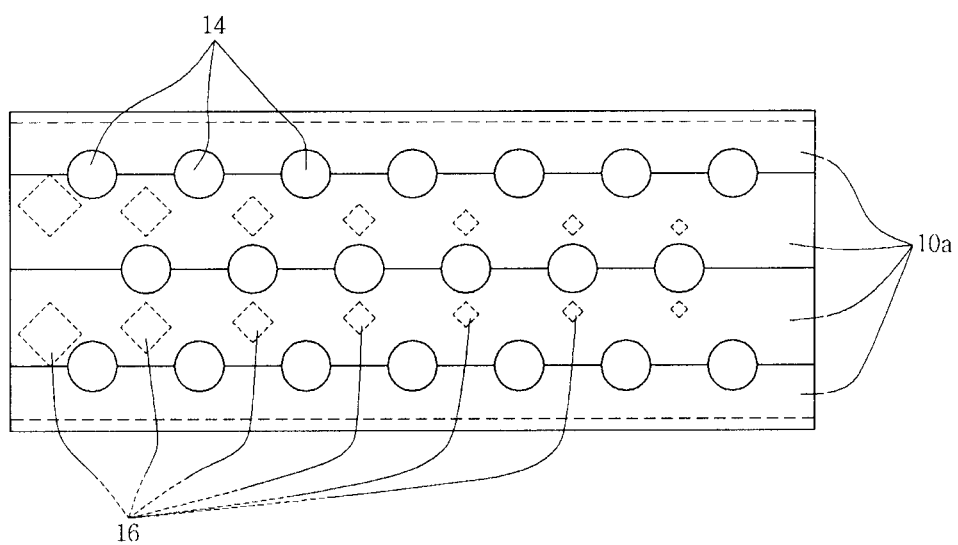
FIG. 7 is a side view showing a storage device for battery modules including the fins of FIG. 6.

According to a fourth embodiment of the invention, as shown in FIGS. 6 and 7, each fin 16 is a square prism, with its corners at the front, rear, upper, and lower sides. This shape minimizes resistance against air flow. In this embodiment, additional bridge walls 10c are not necessary. That is to say, the fins themselves act as the bridge walls. In addition, the heights of fins 16 decrease along the air-flow direction.

In the embodiments described above, relatively few components are required, reducing the weight and volume of the device, in addition to reducing manufacturing cost and improving ease of assembly.

Further, the flow spaces blocked by the fins may gradually increase from the inlet to the outlet of the housing, so that uniform cooling takes place.

Since the fins are simple, cooling performance is improved.

Although some preferred embodiments of the present invention have been disclosed for illustrative purposes, those skilled in the art will appreciate that various modifications, additions and substitutions are possible, without departing from the scope and spirit of the invention as defined in the accompanying claims.

What is claimed is:

1. A storage device for battery modules, comprising:
   a housing comprising outer walls, inner walls between the outer walls, and a bridge wall connecting the outer walls with the inner walls, the inner and outer walls defining through holes, each configured to receive a battery module therein, the housing defining a plurality of fluidly isolated air flow spaces; and
   fins, each protruding from the bridge wall and blocking a portion of one of the flow spaces, the bridge wall continuously connecting adjacent fins;
   wherein the fins completely connect the outer walls with the inner walls or between the inner walls;
   wherein the outer walls, the inner walls, and the bridge wall include grooves in which the fins are fitted;
   wherein the housing is detachably sectioned into the plurality of air flow spaces by at least two of the outer walls, the inner walls, and the bridge wall; and
   wherein heights of the fins from the bridge wall decrease along a direction from an air inlet of the housing to an air outlet of the housing.

2. The storage device as set forth in claim 1, wherein the fins are integral with the bridge wall.

3. The storage device as set forth in claim 2, wherein the bridge wall forms the fins.

4. The storage device as set forth in claim 1, wherein the fins are detachably fitted in the outer walls, the inner walls, and the bridge wall.

5. The storage device as set forth in claim 1, wherein each fin comprises a first plate attached to the bridge wall, and at least one second plate protruding from the first plate.

6. The storage device as set forth in claim 1, wherein the bridge wall form a bottom surface completely connecting the outer and inner walls and the bottom surface completely connects the inner walls.

7. The storage device as set forth in claim 1, wherein the bridge wall is shaped in a flat plane and each bottom portion of adjacent fins is connected to the bridge wall.

8. A storage device for battery modules, comprising:
   a housing comprising outer walls and inner walls between the outer walls, the inner and outer walls defining through holes, each configured to receive a battery module therein, the housing defining a plurality of fluidly isolated air flow spaces; and
   fins, each blocking a portion of one of the flow spaces and connecting the outer walls with the inner walls;
   wherein the fins completely connect the outer walls with the inner walls or between the inner walls;
   wherein the outer walls, the inner walls, and a bridge wall include grooves in which the fins are fitted, the bridge wall continuously connecting adjacent fins;
   wherein the bridge wall connects the outer walls with the inner walls,
   wherein the housing is detachably sectioned into the plurality of air flow spaces by at least two of the outer walls, the inner walls, and the bridge wall; and
   wherein heights of the fins from the bridge wall decrease along a direction from an air inlet of the housing to an air outlet of the housing.

9. The storage device as set forth in claim 8, wherein each fin comprises a polygonal cross-section.

10. The storage device as set forth in claim 8, wherein a thickness of the cross-section of the fins decreases along an air flow direction of the housing.

11. The storage device as set forth in claim 8, wherein the bridge wall is shaped in a flat plane and each bottom portion of adjacent fins is connected to the bridge wall.

* * * * *